United States Patent [19]
Janik et al.

[11] Patent Number: 5,474,676
[45] Date of Patent: Dec. 12, 1995

[54] FILTER BASE ASSEMBLY

[75] Inventors: Leon P. Janik, Suffield; Robert W. Zeiner, Torrington, both of Conn.

[73] Assignee: Stanadyne Automotive Corp., Windsor, Conn.

[21] Appl. No.: 166,445

[22] Filed: Dec. 13, 1993

[51] Int. Cl.⁶ .................................................. B01D 35/30
[52] U.S. Cl. ..................................... 210/249; 248/311.2
[58] Field of Search ........................... 210/249; 248/300, 248/311.2, 312.1

[56] References Cited

U.S. PATENT DOCUMENTS

| 2,277,738 | 3/1942 | Wilkenson | 248/311.2 |
| 3,591,007 | 7/1971 | Crowther | 210/249 |

FOREIGN PATENT DOCUMENTS 67078 10/1913 Switzerland ........................ 210/249

*Primary Examiner*—Matthew O. Savage
*Attorney, Agent, or Firm*—Chilton, Alix & Van Kirk

[57] ABSTRACT

A filter assembly employs a bracket and a base which mounts a disposable filter element cartridge. The bracket has a bracket mounting portion for mounting the bracket to a vehicle and a base mounting portion for mounting the base. The bracket mounting portion may be offset from the base mounting portion to provide mounting flexibility. The base mounting portion has a plurality of outwardly projecting catches that engage and support a corresponding number of hangers on the base. A threaded stud mounted on the bracket is received between the hangers. A nut in threaded engagement with the stud is torqued into engagement with the base, securing the base to the bracket.

11 Claims, 3 Drawing Sheets

5,474,676

FILTER BASE ASSEMBLY

BACKGROUND OF THE INVENTION

This invention relates generally to fuel filters employed in connection with internal combustion engines. More particularly, the present invention relates to fuel filters and lubricating oil filters having a replaceable cartridge for removing foreign particles and/or separating water from the fuel supply or oil system of an internal combustion engine.

Commonly, filters employ a disposable filter cartridge which is replaced at pre-established intervals of filter usage. The cartridge is secured to a base assembly that is mounted to the engine header or some other fixed location. Variations between mounting locations and space constraints between different model engines and different manufacturers require a wide variety of filter configurations and orientations.

In U.S. Pat. No. 4,976,852, which is assigned to the assignee of the present invention, one disclosed fuel filter assembly is mounted to the vehicle by means of a bracket having cooperative shoulders which receive a clamp ring. A bolt extends between aligned openings of the clamp ring and an opening in the bracket for securing the clamp ring to the bracket. The clamp ring surrounds and engages a recessed neck of the filter base for securing the base in position. In U.S. Pat. No. 5,186,829, which is also assigned to the assignee of the present invention, one disclosed fuel filter assembly employs a base that includes an integral mounting bracket. The fuel filter base is mounted directly to the vehicle. Both designs center the filter assembly on the mounting bracket. Additionally, in the integral mounting bracket design the entire filter cartridge is suspended below the mounting bracket. Such designs impose additional design limitations on the filter assembly due to space and mounting constraints.

SUMMARY OF THE INVENTION

Briefly stated, the invention in a preferred form is a bracket assembly for a filter assembly of a type comprising a mounting bracket, a base, a disposable cartridge and a retainer collar which locks the cartridge to the base. The filter base assembly includes a support structure which is utilized to support the filter base on the bracket assembly. The support structure has one or more hangers that engage a ledge structure on the bracket assembly. Additional hangers may be used to engage catches that extend from the bracket assembly. The ledge and catches support the hangers and thus support the rest of the filter assembly. A slot in the support structure receives a threaded stud mounted on the bracket assembly. A nut mounted on the stud is torqued down to engage the support structure and lock the base assembly to the bracket assembly.

Separate bracket assemblies may be designed for each manufacturer and engine model combination. The bracket assembly ledge and catches may be positioned on the bracket and the support structure may be offset from the remainder of the base assembly so as to minimize the impact of engine compartment space constraints on filter assembly design. For example, the support structure may be offset from the filter assembly centerline so that the filter assembly need not be centered on the mounting bracket. Alternatively, the support structure may be located below the top of the base assembly, raising the filter assembly above the best available mounting location. Therefore, the mounting scheme need not impose any additional height requirements or limitations on the filter assembly.

An object of the invention is to provide a new and improved filter assembly.

Another object of the invention is to provide a new and improved filter assembly wherein the filter assembly centerline may be offset from the filter assembly mounting bracket centerline.

A further object of the invention is to provide a new and improved filter assembly that minimizes mounting constraint impact on the filter assembly design.

Other objects and advantages of the invention will become apparent from the drawings and the specification.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which.

DETAILED DESCRIPTION OF THE PREFERRED EMBODIMENT

Figure 1:
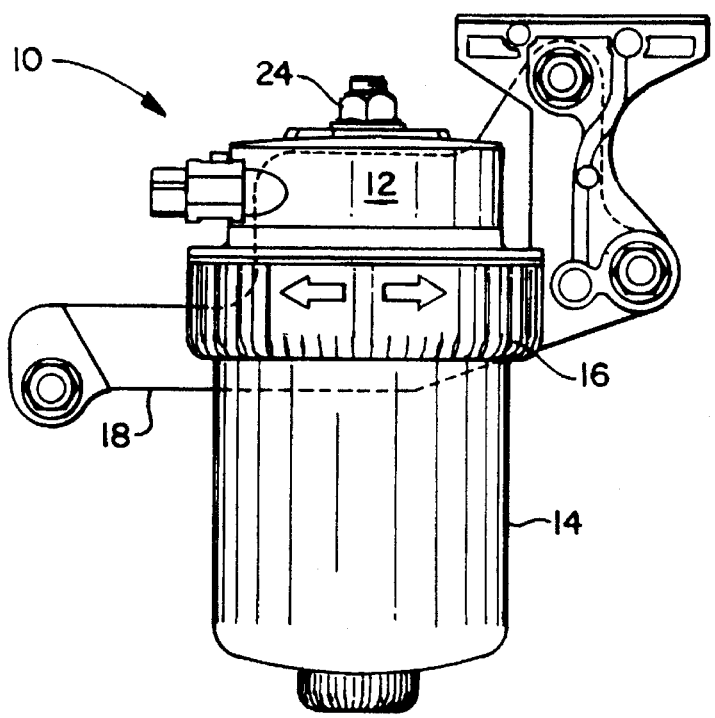
FIG. 1 is an elevated front view, partly in phantom, of a fuel filter assembly incorporating a bracket mounting assembly in accordance with the present invention.
Figure 2:
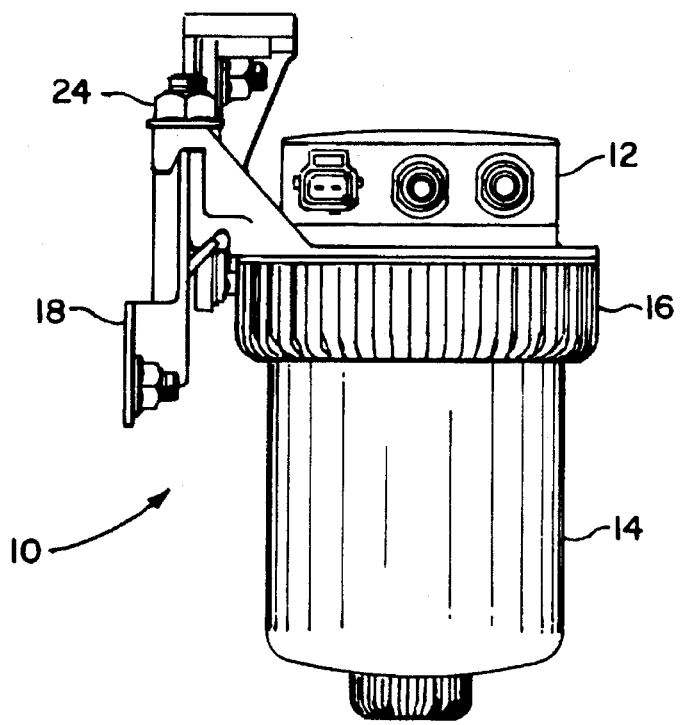
FIG. 2 is an elevated side view of the fuel filter assembly of FIG. 1.
Figure 3:
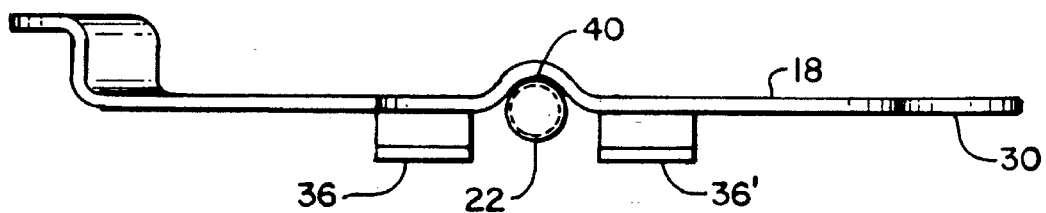
FIG. 3 is an enlarged top plan view of a bracket employed in the fuel filter assembly of Figure 1.
Figure 4:
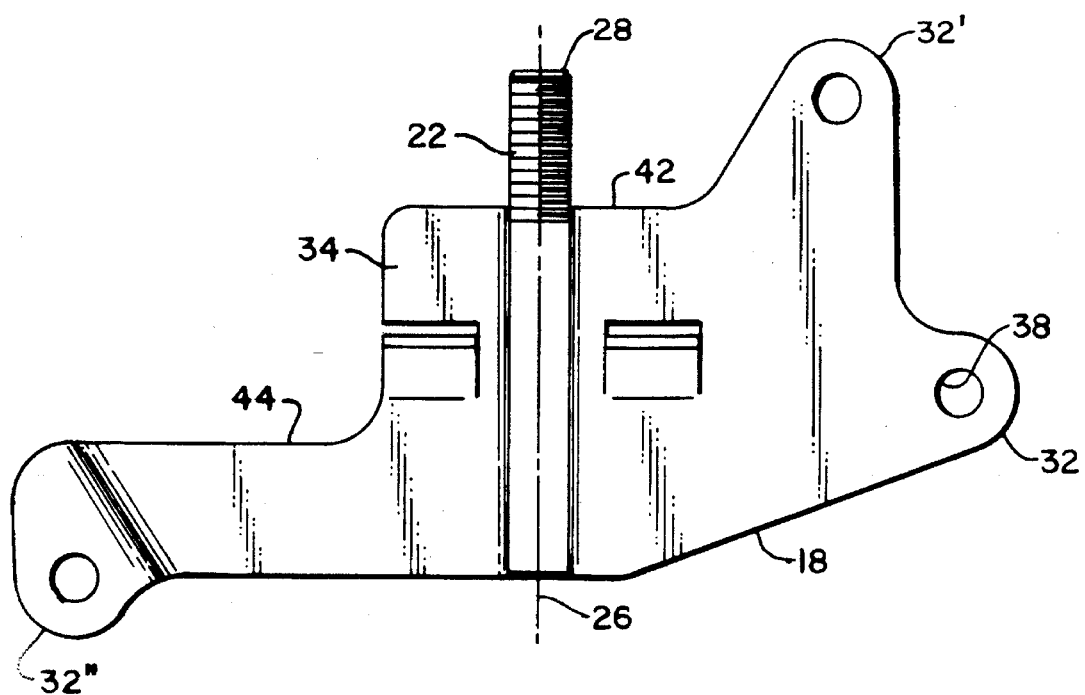
FIG. 4 is an elevated front view of the bracket of FIG. 3.
Figure 5:
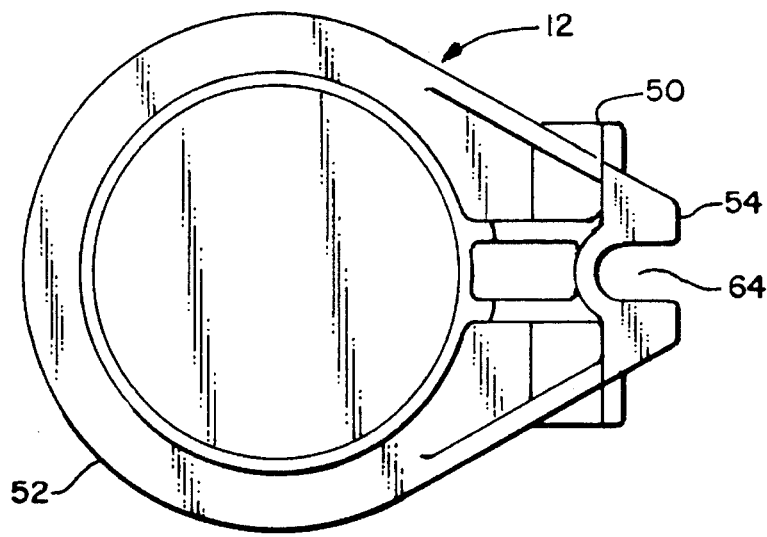
FIG. 5 is an enlarged top plan view of a base assembly employed in the fuel filter assembly of FIG. 1.
Figure 6:
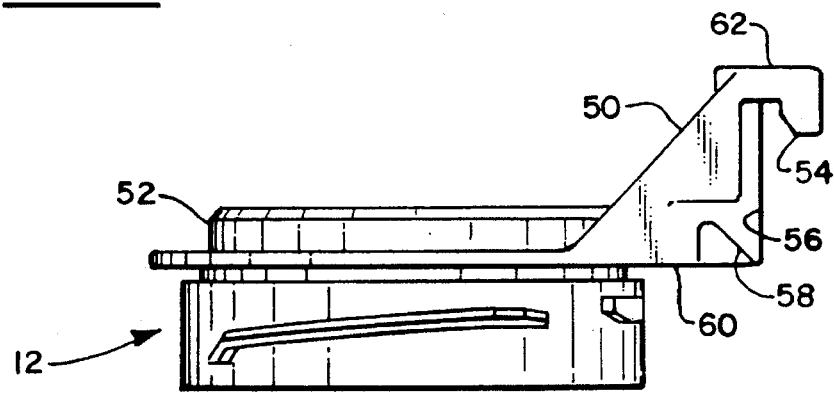
FIG. 6 is an elevated side view of the base assembly of FIG. 5.
Figure 7:
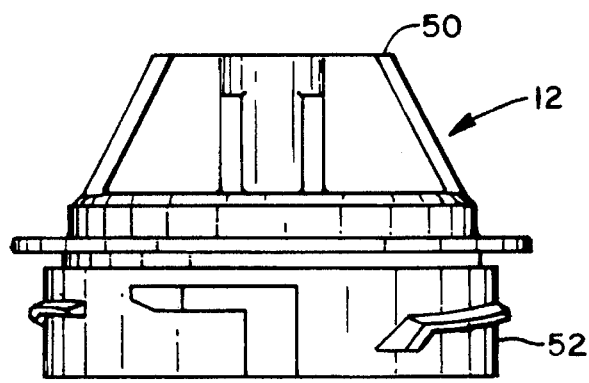
FIG. 7 is an elevated front view of the base assembly of FIG. 5.

With reference to the drawings wherein like numerals represent like parts throughout the several figures, a filter assembly in accordance with the present invention is generally designated by the numeral 10. Filter assembly 10 comprises a base 12, a bracket assembly 18 and a disposable filter cartridge 14. The filter assembly 10 is especially adapted for incorporation into the fuel supply system or lubricating oil system of an internal combustion engine (not illustrated), such as a diesel engine, for removing particulate matter from the fuel or oil and for separating water from the fuel or oil. The illustrated filter assembly is an inverted-type filter assembly wherein the cartridge 14 is suspended generally below the base 12. It should be appreciated that the present invention is also applicable to filter assemblies wherein the cartridge 14 is mounted on top of the base 12. The filter cartridge 14 is secured to the base 12 by means of a retainer collar 16.

The bracket assembly 18 is fixedly mounted to the engine header or other fixed location of the vehicle. The bracket assembly 18 consists of a plate 30 having at least one bracket mounting portion 32, a base mounting portion 34, and an upper edge 44. A portion of the bracket plate upper edge 44 in the base mounting portion 34 defines a ledge 42 and a vertical plane. A plurality of tabs or catches 36 project outwardly from the base mounting portion 34 at an acute angle. The ledge 42 together with the catches 36 support the base 12. In an alternative embodiment, the bracket assembly 18 does not have catches and the base 12 is supported only by the ledge 42.

The bracket assembly 18 is mounted to the vehicle (not shown) at a fixed location. The bracket mounting portion 32 may have mounting holes 38 for receiving bolts or other conventional mounting means (not shown). Alternatively, the bracket mounting portion 32 may be welded to the vehicle. In one embodiment, the bracket mounting portion 32 is laterally offset from the base mounting portion 34. This allows greater flexibility in positioning the filter assembly 10. For example, the bracket assembly 18 may be mounted in a region with limited free space that is adjacent to an area that has sufficient space for the base 12 and filter cartridge 14. In an alternative embodiment multiple bracket mounting portions 32, 32', 32" may be used. Such mounting portions may be laterally, longitudinally and vertically offset for a given application to allow mounting on a plurality of engine compartment members.

A stud 22 is vertically mounted on the base mounting portion 34, the stud axis defining a first vertical axis 26. The upper end of the stud 28 is threaded for engagement with a threaded nut 24. In one embodiment, the stud 22 is mounted in a vertical crease 40 located between a pair of catches 36, 36'. The crease 40 provides the plate 30 with greater rigidity and facilitates mounting of the stud 28.

The base 12 comprises of a support portion 50 and a cartridge mounting portion 52. The base support portion 50 has a plurality of first hook-like hangers 54, projecting outwardly from a first surface 56 at the top of the support portion 50. The top of the first hangers defines a mating surface 62 for retentive engagement with the threaded nut 24. In a preferred embodiment, a plurality of second hangers 58 having a recessed ramp-like form depend from the support portion bottom 60. The first hangers 54 engage and are pivotally supported by the bracket ledge along a transverse interface. The second hangers 58 engage and are supported by the bracket catches 36 in a sliding surface-to-surface wedge-like configuration. The stud 22 is received in a slot 64 between the first hangers 54 whereby the stud vertical axis 26 is axially displaced from the bracket ledge 42 vertical plane. The nut 24 is torqued into engagement with the first hanger mating surface 62, exerting a downward force along the stud axis 26. The downward force creates a moment arm about the bracket ledge, drawing the first hangers 54, second hangers 58 and base first surface 56 into tight engagement with the bracket ledge 42, catches 36 and the bracket base mounting portion 34 surface, respectively.

The cartridge mounting portion 52 defines a central axis for mounting a filter cartridge 14 in generally coaxial disposition therewith. Although the bracket mounting assembly may be employed with a wide variety of fuel filter configurations, the illustrated fuel filter assembly 10 may employ a cartridge mounting portion 52 and filter cartridge similar in form and function to the filter base and filter cartridge disclosed in U.S. Pat. No. 5,186,829, dated Feb. 16, 1993, and entitled "Fuel Filter Key System" or U.S. Pat. No. 5,084,170, dated Jan. 28, 1992, and entitled "Fuel Filter" the disclosure of which is incorporated by reference.

In an alternative embodiment, the stud vertical axis 26 and bracket ledge 42 vertical plane are substantially coincidental whereby the downward force pushes the first 54 and second 58 hangers into tight engagement with the bracket ledge 42 and catches 36.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A filter base assembly comprising:

bracket means having a first surface defining a first plane, said first surface including at least one bracket mounting portion and a base mounting portion, wherein said base mounting portion includes ledge means for defining a ledge, and wherein said bracket means includes an additional bracket mounting portion extending in a second plane that is offset from said base mounting portion in said first plane;

support means for forming a support structure defining a second surface engageable against said base mounting portion and comprising hanger means projected outwardly relative to said support structure and supportable on said ledge means;

base means extending from said support means and defining a central axis for mounting a filter cartridge in generally coaxial disposition therewith; and securement means for securing said bracket means to said support means.

2. A filter base assembly comprising:

bracket means having a first surface defining a first plane, said first surface including at least one bracket mounting portion and a base mounting portion, wherein said base mounting portion includes ledge means for defining a ledge, and wherein said bracket means includes an additional bracket mounting portion extending in a second plane that is offset from said base mounting portion in said first plane;

support means for forming a support structure defining a second surface engageable against said base mounting portion and comprising first hanger means projected outwardly relative to said support structure and supportable on said ledge means;

base means extending from said support means and defining a central axis for mounting a filter cartridge in generally coaxial disposition therewith; and securement means for securing said bracket means to said support means, said securement means comprising threaded stud means fixedly attached to said base mounting portion and threaded nut means threadably engaged on said stud means, said stud means defining a first axis; and wherein said hanger means comprises a slot for receiving said stud means and an engagement surface for engagement by said nut means.

3. The filter assembly of claim 2 wherein said base mounting portion includes a plurality of catches and said support structure includes second hanger means for engaging and supporting said plurality of catches.

4. The filter assembly of claim 3 wherein said ledge means defines a contact line, said first axis being parallel to said first plane, wherein said nut means engages said engagement surface exerting a force along said first axis on said engagement surface whereby a moment arm is created about said contact line whereby said hanger means is drawn into tight engagement with said ledge means and said catches.

5. The filter assembly of claim 3 wherein said nut means engages said engagement surface exerting a force along said first axis on said engagement surface whereby said hanger means is respectively pushed into tight engagement with said ledge means and said catches.

6. A filter base assembly comprising:

bracket means defining a first planar surface, said first planar surface comprising catch means and an edge defining ledge means;

support means for forming a support structure defining a second planar surface engageable against said first planar surface, first hanger means projecting outwardly relative to said second surface and supportable on said ledge means, and second hanger means projecting downwardly from said first portion and supportable on said catch means;

base means extending from said support means and defining a central axis for mounting a filter cartridge in generally coaxial disposition therewith; and securement means for securing said bracket means to said support means.

7. The filter base of claim 6 wherein said securement means comprises threaded stud means fixedly attached to said bracket means and threaded nut means threadably engageable on said stud means for securing said bracket means to said support means, said stud means defining a first axis.

8. The filter base assembly of claim 7 wherein said hanger means defines a slot for receiving said stud means and an engagement surface for engaging said nut means.

9. The filter base assembly of claim 8 wherein said ledge means defines a contact line and said nut means engages said engagement surface exerting a force along said first axis on said engagement surface whereby a moment arm is created about said contact line and said first hanger means is forced against said ledge means and said second hanger means is forced against said catches.

10. A filter base assembly comprising:

bracket means defining a first planar surface, said first planar surface comprising an edge defining ledge means;

support means for forming a support structure defining a second planar surface engageable against said first planar surface and comprising hanger means projecting outwardly relative to said second planar surface and supportable on said ledge means, said hanger means comprising means defining a slot and an engagement surface;

base means extending from said support means and defining a central axis for mounting a filter cartridge in generally coaxial disposition therewith;

securement means for securing said bracket means to said support means, said securement means comprising threaded stud means fixedly attached to said bracket means and threaded nut means threadably engaged on said stud means, said stud means defining a first axis; and, wherein said engagement surface engages said nut means and wherein said hanger means slot receives said stud means.

11. The filter base assembly of claim 10 wherein said ledge means defines a contact line, said first vertical axis being parallel to said first planar surface, wherein said nut means engages said engagement surface to exert a force along said first axis on said engagement surface whereby a moment arm is created about said contact line and said hanger means is drawn into engagement with said ledge means.

* * * * *

UNITED STATES PATENT AND TRADEMARK OFFICE
CERTIFICATE OF CORRECTION

PATENT NO.   : 5,474,676
DATED        : December 12, 1995
INVENTOR(S)  : Leon P. Janik et al It is certified that error appears in the above-indentified patent and that said Letters Patent is hereby corrected as shown below:

Column 5, line 9, "downwardly" should be --outwardly--.

Signed and Sealed this

Twenty-ninth Day of October 1996

Attest:

BRUCE LEHMAN

*Attesting Officer*    *Commissioner of Patents and Trademarks*